US008858985B2

(12) United States Patent
Lee et al.

(10) Patent No.: US 8,858,985 B2
(45) Date of Patent: *Oct. 14, 2014

(54) FILMS COMPRISING A LIQUID-ABSORBANT INNER LAYER, AN ANTIMICROBIAL MATERIAL AND AN IMPERMEABLE OUTER LAYER

(75) Inventors: I-Hwa Lee, Wilmington, DE (US); Karlheinz Hausmann, Auvernier (CH)

(73) Assignee: E I du Pont de Nemours and Company, Wilmington, DE (US)

( * ) Notice: Subject to any disclaimer, the term of this patent is extended or adjusted under 35 U.S.C. 154(b) by 950 days.

This patent is subject to a terminal disclaimer.

(21) Appl. No.: 11/126,652

(22) Filed: May 11, 2005

(65) Prior Publication Data

US 2005/0266056 A1    Dec. 1, 2005

Related U.S. Application Data

(60) Provisional application No. 60/570,546, filed on May 12, 2004.

(51) Int. Cl.
| B32B 27/00 | (2006.01) |
| B32B 27/32 | (2006.01) |
| B32B 27/34 | (2006.01) |
| B32B 27/08 | (2006.01) |
| B32B 27/18 | (2006.01) |
| A23B 4/00 | (2006.01) |
| A23B 4/12 | (2006.01) |
| A23B 4/10 | (2006.01) |
| A23B 4/22 | (2006.01) |
| A23L 1/317 | (2006.01) |
| A22C 13/00 | (2006.01) |

(52) U.S. Cl.
CPC ............... B32B 27/18 (2013.01); A23B 4/002 (2013.01); *A22C 2013/002* (2013.01); A23B 4/12 (2013.01); *A22C 2013/0059* (2013.01); A23B 4/00 (2013.01); A23B 4/10 (2013.01); B32B 27/08 (2013.01); *A22C 2013/0043* (2013.01); A23B 4/22 (2013.01); A23L 1/3175 (2013.01); *A22C 2013/0053* (2013.01); *A22C 2013/0046* (2013.01); *A22C 2013/0083* (2013.01); *A22C 13/0013* (2013.01)
USPC ........................................ 424/443

(58) Field of Classification Search
CPC .......... B32B 27/18; B32B 27/08; A23B 4/00; A23B 4/002; A23B 4/10; A23B 4/12; A23B 4/22
USPC ........................................ 424/443
See application file for complete search history.

(56) References Cited

U.S. PATENT DOCUMENTS

| 5,382,391 | A | 1/1995 | Juhl | |
| 5,573,797 | A | 11/1996 | Wilhoit | |
| 6,172,040 | B1 | 1/2001 | Naidu | |
| 6,187,696 | B1 * | 2/2001 | Lim et al. | 442/77 |
| 6,451,365 | B1 | 9/2002 | King et al. | |
| 7,022,357 | B2 * | 4/2006 | Krallmann et al. | 426/92 |
| 2003/0017194 | A1 | 1/2003 | Joerger et al. | |
| 2003/0055181 | A1 * | 3/2003 | Schenck et al. | 525/425 |
| 2003/0091612 | A1 | 5/2003 | Sabesan | |
| 2003/0118704 | A1 * | 6/2003 | De Vegt et al. | 426/267 |
| 2004/0043922 | A1 | 3/2004 | Naidu | |
| 2004/0047951 | A1 | 3/2004 | Johansson | |

FOREIGN PATENT DOCUMENTS

| EP | 0 563 507 A1 | | 10/1993 | |
| JP | 11-166108 A | | 6/1999 | |
| JP | 11-158359 | | 7/1999 | |
| WO | WO 96/20870 | * | 7/1996 | ............. B65B 31/00 |
| WO | WO9736798 | * | 10/1997 | ............. B65D 81/34 |
| WO | WO 97/44387 | | 11/1997 | |
| WO | WO 02/054878 A1 | | 7/2002 | |
| WO | WO 03/095734 A1 | | 11/2003 | |

OTHER PUBLICATIONS

Hytrel (Dupont), http://www.distrupol.com/downloads/Hytrel(TM)_from_DuPont.pdf, pp. 1-2.*
PCT International Search Report for International Application No. PCT/US2005/016588 dated Aug. 12, 2005.

* cited by examiner

*Primary Examiner* — Rachael E Bredefeld

(57) ABSTRACT

Films comprising a liquid-absorbent layer with an adsorbed antimicrobial material and an impermeable layer are provided. The films can be suitable for preparation of tubular casings and shrinkbags such as casings for foodstuffs. Also disclosed are foodstuffs processed in the tubular casing comprising the antimicrobial material.

17 Claims, No Drawings

FILMS COMPRISING A LIQUID-ABSORBANT INNER LAYER, AN ANTIMICROBIAL MATERIAL AND AN IMPERMEABLE OUTER LAYER

The invention claims priority to U.S. Provisional Application No. 60/570,546, filed May 12, 2004, the entire disclosure of which is incorporated herein by reference.

The invention relates to a film that can be used in packaging and/or for encasing foodstuffs such as one that can be used to incorporate antimicrobial additives into film for making casings, thermoformed pouches and shrinkbags to contain foodstuffs.

BACKGROUND DISCUSSION AND RELATED ART

All references disclosed herein are incorporated by reference.

Food safety of meat products has been a subject of increasing concern with several well-publicized outbreaks of contamination in fresh and ready-to-eat meats by food-borne pathogens in recent years. In a 1999 study, the US Center for Disease Control estimated that foodborne diseases cause about 76 million illnesses, 325 thousand hospitalizations and 5000 deaths in the US annually. A 1999 FDA survey of the literature noted that the annual cost of foodborne illnesses attributed to seven pathogens found in animal products runs to US $6.5 to 35 billion. Countries with reporting systems have documented significant increases during a period from 1975 to 1998 in the incidence of foodborne disease attributing to contamination, survival of microorganism and microbial growth.

In the case of processed ready-to-eat meat and poultry foods such as deli meats, sausages and hot dogs, re-contamination after cooking and other processing (curing, fermenting, drying, etc) may occur because of further handling, peeling, slicing and re-packaging. Of particular concern is the control of *Listeria monocytogenes*, a pathogen with high heat and salt tolerance and capable of thriving in refrigerated conditions. Other pathogens include *Salmonella* species, *Escherichia coli*, and *Staphylococcus aureus*.

The food industry has responded in various ways through irradiation, pasteurizations, high pressure processing, and use of antimicrobial agents. See, e.g., U.S. Pat. Nos. 6,451,365B1, 5,573,797, 6,172,040B1, US Patent Application 2004/0043922A1 and US Patent Application 2003/0091612. In general, coating of antimicrobial compositions onto film is difficult to achieve effectively without a chemical treatment or corona treatment of the film surface. Cellulosic films can absorb up to 35 weight % water, a property useful for delivery of antimicrobial materials, since most of the antimicrobial systems of interest for foodstuffs use an aqueous medium for application. While such films or casings may absorb the antimicrobial solution onto its surface, they do not have adequate barrier nor can they be heat sealed into food packages. Therefore the foodstuff must be removed at some point to be placed into other plastic barrier packaging, which, while providing oxygen or gas barrier, does not have antimicrobial protection.

This invention provides for the use of a multilayer plastic packaging film with an inner water absorptive polymer layer that can deliver antimicrobial materials to the enclosed foodstuff. Such a film may deliver protection through various stages of the distribution chain to the retail level; the other layers of the multilayer packaging have the desirable attributes of packaging film (barrier, abuse resistance, formability, etc). Such a film can also be used to cook meat and then be shipped in the package. Such films can be used to package processed and fresh meats and products (e.g., bacon, case ready, carcass meats, value-added meats, fish, or produce).

SUMMARY OF THE INVENTION

The invention includes a film comprising (i) an inner layer; (ii) at least one antimicrobial material; and (iii) an outer barrier layer; wherein the inner layer can be a liquid absorptive layer useful for imparting antimicrobial materials to meat; the solution can be adsorbed in the absorptive inner layer; and the outer layer can be impermeable barrier layer; the inner layer can comprise or be produced from a polymer including block copolyether ester polymer, block copolyether amide polymer, or combinations thereof; the outer layer can be a single film layer, or a laminate or multilayer film comprising or produced from at least one polymer layer and optionally at least one tie layer; and the polymer layer comprises or is produced from a polymer including polyamide, ethylene vinyl alcohol copolymer, polyvinylidene chloride, polyolefins, or combinations of two or more thereof.

The invention also includes a tubular casing or shrinkbag or thermoformable pouch comprising a film comprising or produced from the film disclosed above in which the inner layer can impart antimicrobial material evenly to meat.

The invention also includes a process that can be used for processing foodstuff comprising preparing a film, which can be as disclosed above; contacting the film with a solution comprising at least one antimicrobial agent to produce an antimicrobial film; optionally washing the antimicrobial film; contacting the antimicrobial film with foodstuff to produce a foodstuff contacted with antimicrobial film; and optionally heating the foodstuff.

The invention also includes a foodstuff treated with antimicrobial materials or agents using the film.

DETAILED DESCRIPTION OF THE INVENTION

An inner layer can be any layer other than the outer barrier layer. For example, an inner layer can be the innermost layer (the layer that can come into direct contact with foodstuff placed inside a casing) or an absorptive inner layer (any layer positioned between the innermost layer and the outer barrier layer). The outer layer is the layer farthest from the foodstuff.

Polymers used in an absorptive layer can be hydrophilic and hygroscopic. A copolyether ester (PEPE) can be a thermoplastic polymer and can have a viscosity in the range of from about 20 pascal seconds (Pa·s) to about 3000 Pa·s, about 40 to about 1000 Pa·s, or about 50 to about 700 Pa·s, as determined according to standard method ISO11443.

The PEPE can have a melting point greater than 120° C. or in the range of from about 120° C. to about 220° C., as determined by differential scanning calorimetry (DSC) according to standard ISO 3146.

Copolyether esters are described in U.S. Pat. No. 4,725,481. Preferably, PEPE has a multiplicity of repeating long-chain ester units and short-chain ester units that are randomly joined through head-to-tail ester linkages.

The repeating long-chain ester units can be represented by formula (I) ([A-O-G-OC(O)—R—C(O)-A]) and the repeating short-chain ester units can have formula (II) ([A-O-D-OC(O)—R—C(O)-A]) in which "A" denotes the remaining unspecified portion of the copolyether ester polymer; G is a divalent radical remaining after removal of terminal hydroxyl groups from a poly(alkylene oxide) glycol having a molecular weight in the range of from about 400 to about 3500, preferably from about 1000 to about 2500; R is a divalent radical remaining after removal of both carboxylic acid groups from a dicarboxylic acid having a molecular weight less than about 300; and D is a divalent radical remaining after removal of hydroxyl groups from a diol having a molecular weight of less than about 250. Short chain ester unit (II) can be the reaction product obtained from an esterification reaction between a diol and a dicarboxylic acid.

An ester unit, if it is not a terminal ester unit, can be bonded at both ends to long chain ester units, or at both ends to short chain ester units, or at one end to a long chain ester unit and at the other end to a short chain ester unit, and further provided that if the ester unit is a terminal unit, one of the unspecified portions in Formula I or Formula II is a substituent other than a long chain ester unit or a short chain ester unit. The term "terminal" refers to an ester unit having the meaning that is conventional in the polymer art, i.e., referring to an ester unit at the end of a polymer chain.

PEPEs can have a moisture vapor transmission rate of at least about 1200 (or about 1200 to about 20000) $g \cdot 25\mu/m^2 \cdot 24$ hrs as determined according to ASTM D6701-01.

Poly(alkylene oxide) glycols used to prepare copolyether esters can be poly(propylene ether) glycols and/or poly(ethylene ether) glycols. Ethylene oxide groups can be incorporated into the PEPEs. Long chain glycols (i.e., glycols having a molecular weight of greater than 400) can comprise sufficient ethylene oxide so that the copolyether ester incorporates from about 5 to about 68 weight %, 15 to about 68 weight %, or about 20 to about 55 weight %, ethylene oxide units based on the total weight of the copolyether ester. Reference to ethylene oxide groups incorporated in the copolyether ester(s) describes the weight % in the total copolyether ester(s) of (—CH$_2$—CH$_2$—O—) groups in the long-chain ester units.

The ethylene oxide groups in the PEPE that are counted to determine the amount of ethylene oxide groups in the polymer are those derived from the poly(alkylene oxide)glycol and not ethylene oxide groups introduced into the copolyether ester by means of a low molecular weight diol.

Long-chain glycols can include poly(ethylene oxide) glycol, ethylene oxide-capped poly(propylene oxide) glycol, mixtures of poly(ethylene oxide)glycol with other glycols such as ethylene oxide capped poly(propylene oxide) glycols and/or poly(tetramethylene oxide) glycol that result in PEPE having ethylene oxide groups, for example, of at least about 5 weight %. PEPEs prepared from poly(ethylene oxide)glycols having a molecular weight of from about 600 to 2500 are preferred. Particularly preferred are PEPEs prepared from an ethylene oxide capped poly(propylene oxide) having a molecular weight of about 2150.

Low molecular weight diols can include acyclic, alicyclic and aromatic diols such as diols having from 2 to 15 carbon atoms including, but not limited to, ethylene glycol, propylene glycol, isobutylene glycol, butylene glycol, 1,4-pentamethylene glycol, 2,2-dimethyltrimethylene glycol, and decamethylene glycols, dihydroxycyclohexane, cyclohexane dimethanol, resorcinol, hydroquinone, 1,5-dihydroxynaphthalene, similar diols, and combinations of two or more thereof. Preferred can include aliphatic diols containing from 2 to 8 carbon atoms such as 1,4-butanediol. Bisphenols include bis(p-hydroxy)diphenyl, bis(p-hydroxyphenyl) methane, bis(p-hydroxyphenyl)propane, and combinations of two or more thereof. Equivalent ester-forming derivatives of diols can also be useful including ethylene oxide or ethylene carbonate. The low molecular weight pertains to the diol, not to its derivatives.

Dicarboxylic acids can be aliphatic, cycloaliphatic or aromatic dicarboxylic acids, and functional equivalents thereof including esters and ester-forming derivatives such as acid halides and anhydrides. The molecular weight disclosed pertains to the acid form, not to its equivalent ester or ester-forming derivative.

Aliphatic dicarboxylic acids are carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. Some unsaturated acids, such as maleic acid, can be used.

Aromatic dicarboxylic acids are those having two carboxyl groups attached to a carbon atom in a carbocyclic aromatic ring structure, but both functional carboxyl groups may not be attached to the same aromatic ring (if more than one ring is present) and can be joined by aliphatic or aromatic divalent radicals or divalent radicals such as —O— or —SO$_2$—.

Dicarboxylic acids can include sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid, decahydro-1,5-naphthylene dicarboxylic acid, 4,4,'-bicyclohexyl dicarboxylic acid, decahydro-2,6-naphthylene dicarboxylic acid, 4,4'-methylenebis(cyclohexyl)carboxylic acid, 3,4-furan dicarboxylic acid, phthalic acid, terephthalic acid, isophthalic acid, bibenzoic acid, substituted dicarboxy compounds with two benzene nuclei (e.g., bis(p-carboxyphenyl) methane), p-oxy-1,5-naphthalene dicarboxylic acid, 2,6-naphthalene dicarboxylic acid, 2,7-naphthalene dicarboxylic acid, 4,4,'-sulfonyl dibenzoic acid, or one or more $C_1$-$C_{12}$ alkyl and ring substitution derivatives thereof (e.g., halo, alkoxy, and aryl derivatives). Hydroxyl acids such as p-(beta-hydroxyethoxy)benzoic acid can also be used providing an aromatic dicarboxylic acid is also present. Among the aliphatic acids, cyclohexane dicarboxylic acids and adipic acid are frequently used. Among the aromatic acids, those with from 8 to 16 carbon atoms such as terephthalic acid alone or with a mixture of phthalic and/or isophthalic acids are frequently used.

The copolyether esters can contain from about 25 weight % to about 80 weight % short-chain ester units corresponding to Formula (II) above, the remainder being long-chain ester units corresponding to Formula (I) above. Wishing not to be bound by theory, PEPEs contain less than about 25 weight % short-chain ester units, the crystallization rate may become slow and the PEPEs may be tacky, though may be useful, to handle and, on the other hand, if containing more than about 80% short-chain ester, the PEPEs may become too stiff, though may be useful. The PEPEs preferably contain about 30 to about 60 weight %, or about 40 to about 60 weight %, short-chain ester units, the remainder being long-chain ester units. Increasing short-chain ester units may increase tensile strength and modulus, but may decrease moisture vapor transmission rate. Also preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the PEPE, isophthalic acid is the acid of choice and if a second low molecular weight diol is used, 1,4-butenediol or hexamethylene glycol are the diols of choice.

Blends of different PEPEs can be used.

Other components may be added to optimize the reaction process or the performance of the PEPEs.

Block PEPEs and their preparation are disclosed in *Encyclopedia of Polymer Science and Engineering*, Volume 12, pages 76-177 (1985) and the references reported therein.

Suitable block copolyether esters can include products commercially available from companies under tradenames, for example, Hytrel® available from E. I. du Pont de Nemours and Company (DuPont), Riteflex® available from Ticona, and Arnitel® available from DSM.

The absorptive layer in the film may also comprise block copolyetheramides. Such block copolyetheramides can comprise or consist of crystalline polyamide and noncrystalline polyether blocks. Polyamides may be nylon 6 or nylon 12. A commercially available series of polyetheramides are available under the tradename "Pebax®" from Atofina.

Impermeable Outer Layer(s)

An impermeable layer can be a single film layer, a laminate or multilayer film which comprises at least one layer of film comprising a polymer including polyamides; ethylene vinyl alcohol copolymers; polyvinylidene chloride; and polyolefins. The layer optionally comprises an adhesive layer, useful as a tie layer between two non-compatible layers in a laminate outer layer. The adhesive layer (tie layer) can comprise anhydride-modified ethylene homopolymers, anhydride-modified ethylene copolymers, and/or others known to one skilled in the art.

The layer can serve as impermeable barrier structure and comprise several layers of polymers to provide effective barriers to moisture and oxygen and bulk mechanical properties suitable for processing and/or packaging the foodstuff, such as clarity, toughness and puncture-resistance. For smoking and/or cooking processes, shrink properties can be desirable. Examples of multilayer barrier structures include, from outermost layer to innermost layer: polyethylene/tie layer/polyamide; polyethylene/tie layer/polyamide/tie layer/polyethylene; polypropylene/tie layer/polyamide/EVOH/polyamide; polyamide/tie layer/polyethylene; polyamide/tie layer/polyethylene/tie layer/polyamide; polyamide/tielayer/polyamide/EVOH/polyamide. Depending on the nature of the innermost layer of the impermeable structure, an additional inner tie layer can be interposed between the impermeable structure and the absorptive layer to provide a desirable level of adhesion to the absorptive layer.

Polyamides suitable for use herein include aliphatic polyamides, amorphous polyamides, or combinations thereof. Aliphatic polyamides can refer to aliphatic polyamides, aliphatic copolyamides, and blends or mixtures of these such as polyamide 6, polyamide 6.66, blends and mixtures thereof. Polyamides 6.66 are commercially available under the tradenames "Ultramid C4" and "Ultramid C35" from BASF, or under the tradename "Ube5033FXD27" from Ube Industries Ltd. Polyamide 6 is commercially available under the tradename Nylon 4.12 from DuPont.

The aliphatic polyamide may have a viscosity ranging from about 140 to about 270 cubic centimeters per gram ($cm^3/g$) measured according to ISO307 at 0.5% in 96% $H_2SO_4$.

The film may further comprise other polyamides such as those disclosed in U.S. Pat. Nos. 5,408,000; 4,174,358; 3,393,210; 2,512,606; 2,312,966 and 2,241,322. The film may also comprise partially aromatic polyamides. A suitable partially aromatic polyamide is the amorphous copolyamide 6-I/6-T of the formula of $[C(O)ArC(O)N(H)CH_2CH_2CH_2CH_2CH_2CH_2NH]_n$ where Ar is an arylene group or a phenylene group. Some partially aromatic copolyamides are the amorphous nylon resins 6-I/6-T commercially available under the tradename Selar® PA from DuPont or under the trademark Grivory® G 21 from EMS-Chemie AG.

Polyolefins include polypropylenes, polyethylene polymers and copolymers. Polyethylenes can be prepared by a variety of methods, including well-known Ziegler-Natta catalyst polymerization (see e.g., U.S. Pat. Nos. 4,076,698 and 3,645,992), metallocene catalyst polymerization (see e.g., U.S. Pat. Nos. 5,198,401 and 5,405,922) and by free radical polymerization. Polyethylene can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities of polyethylenes suitable for use in the present invention range from 0.865 g/cc to 0.970 g/cc. Linear polyethylenes can incorporate α-olefin comonomers such as butene, hexene or octene to decrease density within the density range. The impermeable layer can comprise ethylene copolymers such as ethylene vinyl esters, ethylene alkyl acrylates, ethylene acid dipolymers, ethylene acid terpolymers and their ionomers. Examples of such ethylene copolymers are ethylene vinyl acetate, ethylene methyl acrylate and ethylene (meth) acrylic acid polymers and their ionomers. Polypropylene polymers useful in the practice of the present invention include propylene homopolymers, impact modified polypropylene and copolymers of propylene and alpha-olefins and their blends.

Polyethylene/vinyl alcohol copolymers ("EVOH") having from about 20 to about 50 mole % ethylene can be suitable such as those under the tradename Evalca® from Kuraray or Noltex® from Nippon Goshei. Polyvinylidene chloride (PVDC) can be obtained commercially from Dow Chemical under the tradename Saran®.

Anhydride or acid-modified ethylene and propylene homo- and co-polymers can be used as extrudable adhesive layers ("tie" layers) to improve bonding of layers of polymers together when the polymers do not adhere well to each other, thus improving the layer-to-layer adhesion in a multilayer structure. The compositions of the tie layers can be determined according to the compositions of the adjoining layers that need to be bonded in a multilayer structure. One skilled in the polymer art can select the appropriate tie layer based on the other materials used in the structure. Various tie layer compositions are commercially available under the trademark Bynel® from DuPont.

Impermeable films can additionally comprise one or more materials or agents, such as the conventional additives used in polymer films including plasticizers, stabilizers, antioxidants, ultraviolet ray absorbers, hydrolytic stabilizers, antistatic agents, dyes or pigments, fillers, fire-retardants, lubricants, reinforcing agents such as glass fiber and flakes, processing aids, antiblock agents, release agents, and/or mixtures thereof.

Polymers disclosed herein can be converted into a laminate film by various techniques. For example, a laminate film can be obtained by coextrusion as follows: granulates of the various components can be melted in extruders; the molten polymers passed through a die or set of dies to form layers of molten polymers that are then processed as a laminar flow. The molten polymers can be cooled to form a layered structure. The coextruded polymer film can be further laminated onto one or more other films such as oriented polyester or oriented polypropylene.

Other suitable techniques include blown film extrusion, cast film extrusion, cast sheet extrusion and extrusion coating. The impermeable barrier film disclosed herein can be a blown film obtained by a blown film extrusion process.

A laminate film can be further oriented beyond the immediate quenching or casting of the film. The process can comprise coextruding a multilayer laminar flow of molten polymers, quenching the coextrudate and orienting the well-quenched coextrudate in at least one direction. "Well-quenched" means an extrudate that has been substantially cooled below its melting point in order to obtain a solid film.

The film may be uniaxially oriented, or biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

In a preferred embodiment, the laminate film is oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which may induce longitudinal orientation.

The processing to obtain an oriented blown film is known in the art as a double bubble technique, and can be carried out as disclosed in U.S. Pat. No. 3,456,044. For example, a primary tube is melt extruded from an annular die. This extruded primary tube is cooled quickly to minimize crystallization. It is then heated to its orientation temperature (e.g., by means of a water bath). In the orientation zone of the film fabrication unit a secondary tube is formed by inflation, thereby the film is radially expanded in the transverse direction and pulled or stretched in the machine direction at a temperature such that expansion occurs in both directions, maybe simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties. For preparation of food casings (e.g., sausage casings, shrink bags) it may be desirable to maintain the film in a tubular form. For preparing flat films the tubular film can be slit along its length and opened up into flat sheets that can be rolled and/or further processed.

In another embodiment, films can also be made into bags, such as vacuum bags, shrinkbags, and pouches. Such bags can be formed from tubular film by sealing and then cutting the film transversely. Alternatively, the tubular film may be slit into flat film, and then sealed transversely at the top and bottom to produce bags. Alternatively, flat film whether produced by tubular or cast processes may be made into bags by folding the film and then sealing and cutting along two exposed lengths. Other methods of making bags and pouches are well known and can be used.

Antimicrobial Agent

The films, tubular casings, shrink bags and the like are further treated by the adsorption of at least one antimicrobial agent in solution into the absorbent layer of the casing. The antimicrobial material is subsequently transferred to the foodstuff by contact of the foodstuff with the film surface and during such food processing as heating, curing, smoking or cooking for example. The antimicrobial composition remains in contact with the foodstuff until the foodstuff is ready to be consumed, because the laminate films as disclosed herein can be used to package the foodstuff.

Suitable antimicrobial materials include combinations of bacterial polypetides and hop extracts; combinations of a bactericidal compound and beta hops acid or beta hops acid derivative or both; combinations comprising natamycin, dialkyl dicarbonate and a sorbate preservative; combinations comprising calcium lactate and a sequestering agent (including, but not limited, citric acid, tartaric acid, maleic acid, oxalic acid, ascorbic acid, erythorbic acid, phosphoric acid, benzoic acid, sorbic acid, salts thereof and mixtures thereof; heat-treated lactic and/or glycolic acid; lantibiotics; lysozyme; pediocin; lacticin; activated lactoferrin; Chitosan; and combinations of two or more thereof. Chitosan disclosed here also include a salts or derivative of the chitosan. Sodium acetate or sodium acetate may also be added to augment the antimicrobial combinations. Lactoferrin can be immobilized on a naturally occurring substrate via the N-terminus region of the lactoferrin. The bactericidal compound is lantibiotic, pediocin, lacticin class bacteriocin, lytic enzyme, or combinations of two or more thereof.

These antimicrobial agents can be used to effectively control a wide range of harmful microorganisms including those such as *Listeria monocytogenes, Listeria innocua, Salmonella Typhimurium* and other *S.* sp., *Bacillus cereus, B. subtilis, Saccharomyces cerevisiae, S. cerevisiae* var. *paradoxes, S. carlsbergensis, Pseudomonas fluorescens, Clostridium sporogenes, Lactobacillus sake, Brochothrzx thermosphacta, Micrococcus luteus, Yersinia enterocolitica, Enterobacter aerogenes, Zygosaccharomyces bailii*, or combinations of two or more thereof.

Also disclosed is a process that can be used for processing foodstuff where the film disclosed above can be contacted with a solution comprising at least one antimicrobial agent disclosed above. The solution can be water itself or water and about 0.1 to about 95 weight or volume % of a solvent such as an alcohol to facilitate the dissolution of the agent. One of the solvents is ethanol for it is frequently used in foodstuff. Other solvent can include acetone, acetic acid, propionic acid, butyric acid, or combinations of two or more thereof. The solution can comprise about 0.01 to about 50%, or about 0.1% to about 20%, or about 0.2% to about 10%, or about 0.2 to about 8%, by weight of the antimicrobial agent.

The solution comprising antimicrobial agent can be absorbed or impregnated into the film thereby producing an antimicrobial film containing an antimicrobial agent. The absorption or impregnation can be carried out by any means known to one skilled in the art such as soaking the solution by the film.

The antimicrobial film can be washed with water, a solvent, or a solution containing about 0.1 to about 50 weight % of a base or an acid such as a metal hydroxide or mineral acid or low alkyl fatty acid. The wash can be carried out at any ambient temperature or as high as 100° C. for about 1 minute to about 5 hours. The antimicrobial film, whether washed or not, can be made into an article as disclosed above. The article can include pouch, bag, carton, blister, box, a thermoformed film, a vacuum skin film, or other container. The article can be contacted with essentially all known foodstuff including those perishable foodstuff to produce a foodstuff containing antimicrobial agent. Such foodstuff can be optionally heated at an elevated temperature, e.g., at about 30 to about 250° C. for a period of about 1 minute to about 5 hours.

Examples of foodstuffs that can be processed and packaged using a film of this invention include beef, pork, poultry (e.g., chicken and turkey), seafood (e.g., fish and mollusks) and cheese. Meat products include, but are not limited to, sausages, lunchmeats, hams, turkey, hot dogs and kielbasa. Meat products can be whole-muscle, formulated into various meat slurries, formed into shapes, or ground. Formed or ground meat can optionally be a mixture of material derived from more than one species. The foodstuff can be processed prior to its introduction into a film of the present invention and then further processed in the packaging film.

The antimicrobial films can be made in the form of pouches, bags, casings or thermoformed films. The films may be laminated onto other substrates before being thermoformed. Such films may then be used to package uncooked meat or carcass meats (e.g. beef, pork, poultry or seafood) or processed meats such as hot dogs, sausages, ready-to-eat deli meats (e.g. ham, poultry, bologna, etc).

The following Examples are merely illustrative and are not to be construed as to limit the scope of the invention. In the Tables, "w %" stands for weight %. Table 1 discloses examples (1-3 were for copolyether ester and 4-5 were for copolyether amide) and comparative examples (1 was nylon, 2 was nylon 6.66, 3 was a DuPont commercial copolyester Selar® PT 8307, and 4-5 were copolyether esters containing no ethylene oxide unit) of the compositions of the absorptive layer for testing disclosed in Table 2.

TABLE 1

| Example | MP(° C.) | Description |
|---|---|---|
| 1 | 200 | 45 w % 1,4-butylene terephthalate, 55 w % ethylene oxide/propylene oxide copolyether terephthalate. Calculated ethylene oxide content of 33%. |
| 2 | 170 | 42 w % 1,4-butylene terephthalate, 12 w % 1,4-butylene isophthalate, 36 w % ethylene oxide/propylene oxide copolyether terephthalate, 10 w % ethylene oxide/propylene oxide copolyether isophterephthalate. Calculated ethylene oxide content of 13%. |
| 3 | 155 | 32 w % 1,4-butylene terephthalate, 9 w % 1,4-butylene isophthalate, 46 w % ethylene oxide/propylene oxide copolyether terephthalate, 13 w % ethylene oxide/propylene oxide copolyether isophterephthalate. Calculated ethylene oxide content of 17%. |
| 4 | 156 | Pebax ® MV 1074 |
| 5 | 195 | Pebax ® MH 1657 |
| Comp 1 | 219 | Capron ® B135ZP |
| Comp 2 | | Ultramid ® C135 |
| Comp 3 | | Selar ® PT 8307 |
| Comp 4 | 211 | 70 w % 1,4-butylene terephthalate, 30 w % poly(tetramethylene oxide) terephthalate. Calculated ethylene oxide content of 0%. |
| Comp 5 | 203 | 60 w % 1,4-butylene terephthalate, 40 w % poly(tetramethylene oxide) terephthalate. Calculated ethylene oxide content of 0%. |

The polymers of Table 1 were coextruded with other non-adhering polymers on a three-layer blown film line in order to generate three-layer films in which the absorptive layer of the film could be easily removed. In all cases, either HDPE or nylon 6 was the other layer coextruded against the polymers of Table 1. In a number of cases, an antiblock concentrate sold by DuPont as Conpol® AC B was also added as described in the cases below. Blow up ratio was 2:1, and the stripped film layers had various thicknesses ranging from 25 to 64 µm.

In order to determine moisture pickup after 24 hours, the coextruded films were cut into 15.24 cm by 15.24 cm (6×6 inches) squares and then stripped. The absorptive film layer was then conditioned at 23° C. and 20% relative humidity for at least 24 hours before being weighed and then placed in a container of water. After 24 hours, the films were taken out, dried with paper towels so that no free moisture was visible on surfaces, and then immediately weighed. For each example in Table 2, the average taken of three samples was reported as the weight % moisture absorption. The films conditioned at 23° C. and 20% relative humidity for at least 24 hours were also measured for moisture vapor transmission rate (MVTR) at 38° C. and 100% relative humidity. For samples with high water permeability, MVTR tests were conducted on a Mocon Permatran-W® 101K, following ASTM D6701-01. For the other samples, the MVTR tests were conducted on a Mocon Permatran-W® 700 (ASTM F1249-01).

TABLE 2

| Ex. | Polymer Type | Film Gauge (µ) | 24 Hour Water Gain (w %) | MVTR |
|---|---|---|---|---|
| 1 | Copolyether ester 1 | 30 | 23.9 | 14463 |
| 1 | Copolyether ester 1 | 53 | 24.0 | 16635 |
| 1 | Copolyether ester 1 | 64 | 24.1 | 14109 |
| 2 | Copolyether ester 2 | 48 | 2.1 | 2261 |
| 3 | Copolyether ester 3 | 41 | 5.9 | 5115 |
| 4 | Copolyester amide 1 | 43 | 29.8 | 10698 |
| 5 | Copolyester amide 2 | 43 | 60.6 | 13106 |
| Comp 1 | Nylon 6 | 20 | 7.6 | 651 |
| Comp 2 | Nylon 6.66 | 22 | 8.2 | 809 |
| Comp 3 | Copolyester | 25 | 1.1 | 169 |
| Comp 4 | Copolyether ester 4 | 46 | 0.7 | 762 |
| Comp 5 | Copolyether ester 5 | 46 | 0.1 | 822 |

Note:
Examples 1, 2 and 3 and Comparative Examples 4 and 5 also contained 2 w % antiblock, Conpol ® AC B. MVTR unit was g · 25 µm/m$^2$ · day.

Table 2 shows both high moisture absorption and high moisture transmission, whereas the comparative examples either show either poor moisture absorption and poor transmission or good moisture absorption but poor transmission.

Moisture pickup as a function of time up to 24 hours was also recorded. The films were subjected to the same treatment as described for Table 2. After each exposure in water, the films were taken out, patted dry with paper towels so that no free moisture was visible on the film surfaces, and then immediately weighed. These films were then discarded, and a different set of films used to measure the water pick up for a different exposure time. For each example and time in Table 3, the average measured for three samples was recorded as the weight % moisture absorption.

TABLE 3

| Water Absorption (weight % gain) at 23° C. over Time | | | | | | | | |
|---|---|---|---|---|---|---|---|---|
| Exam. | Gauge (µ) | 0 h | 0.5 h | 1 h | 3 h | 5 h | 7 h | 24 h |
| 1[a] | 53 | 0 | 18.2 ± 6.0 | 23.6 ± 5.0 | 22.7 ± 0.5 | 21.1 ± 0.8 | 24.2 ± 0.4 | 24.0 ± 1.4 |
| 1[b] | 53 | 0 | 16.0 ± 15 | 23.2 ± 16 | 21.8 ± 0.8 | 19.9 ± 1.4 | 23.0 ± 1.2 | 23.8 ± 0.5 |
| 2[a] | 48 | 0 | 2.4 ± 0.2 | 2.6 ± 0.3 | 2.1 ± 0.3 | 2.4 ± 0.1 | 2.7 ± 0.2 | 2.07 ± 0.2 |
| 3[a] | 64 | 0 | 7.4 ± 4 | 3.8 ± 4.3 | 6.9 ± 1.0 | 4.2 ± 0.4 | 5.41 ± 1.6 | 5.9 ± 0.4 |
| Comp 5[a] | 43 | 0 | 0.6 ± 0.8 | 1.4 ± 1.6 | 0.4 ± 0.2 | 2.7 ± 3.4 | 0.2 ± 0.1 | 0.1 ± 0.1 |
| Comp 2 | 22 | 0 | 10.1 ± 0.1 | 8.6 ± 1.8 | 7.9 ± 0.7 | 8.6 ± 0.8 | 7.0 ± 0.8 | 8.2 ± 1.0 |

[a]Examples 1, 2, 3 and Comparative Example 5 also contained 2 weight % antiblock Conpol ® AC.
[b]Example 1 also contained 15 weight % antiblock Conpol AC B.

The table shows that water pick up occurred quickly for both examples and comparative examples. Within 0.5 hours, the examples were close to or about the equilibrium level of water pickup at 23° C.

Moisture release from the films as a function of time and temperature was also recorded. In these experiments, the films were conditioned to 23° C. at 20% relative humidity for at least 24 hours, weighed to record its 'dry' weight, then placed in water at 23° C. for at least 24 hours (in some cases for 2 to 3 days) taken out, patted dry with paper towels so that no free moisture was visible on the film surfaces, and immediately weighed for its water-absorbed weight. Immediately after being weighed, the films were suspended in a radiant heat oven set at 90° C. No more than three films were placed in the oven at any one time, so that the individual films did not touch each other or the sides of the oven wall. The films were then taken out at 5, 10 and 60 minutes to be weighed. The averages of five to eight film samples are reported in Table 4 below.

TABLE 4

% Weight Loss[a] with Time at 90° C.

| | W % water pickup after soaking at 23° C. for 24 hours or greater | 5 minutes | 10 minutes | 60 minutes |
| --- | --- | --- | --- | --- |
| EX 1[b] | 29.4 ± 3.7 | −1.0 ± 1.2 | −0.8 ± 1.1 | −0.8 ± 1.2 |
| EX 3[b] | 5.4 ± 0.6 | −0.8 ± 0.2 | −0.9 ± 0.2 | −0.8 ± 0.2 |
| EX 4 | 45 ± 1 | −0.6 ± 0.4 | −0.8 ± 0.3 | −0.9 ± 0.3 |
| Ex 5 | 129 ± 9 | 8.9 ± 5.6 | −8.1 ± 0.6 | −8.3 ± 0.3 |
| Comp 5[b] | 0.8 ± 1.0 | −0.2 ± 0.2 | −0.05 ± 0.2 | −0.1 ± 0.2 |

[a]% weight loss from 'dry' weight of film, as described in the text.
[b]Examples contained 2 w % antiblock, Conpol ® AC B.

The results in Table 4 show that the water-absorbed films very quickly released their water content at 90° C. within 5 minutes. In many cases the weight of the films fell below the original 'dry' weight possibly because the original 'dry' weight was taken at 20% relative humidity, whereas the films were at a lower relative humidity with the heat treatment.

The effectiveness of various antimicrobial solutions on films of the examples was also tested, as described variously below.

Film containing 53μ of Example 1 was hand-dipped into a solution of deionized water with 0.5 w % acetic acid and 1 w % chitosan (2-amino-2-deoxy-β-D-glucopyranose) obtained from Primex, Iceland, under the trade name Chitoclear PM588 for less than 1 minute and then allowed to dry. A second identical film was left untreated. These two films were then subject to a shake flask test as described below.

A single, isolated colony from an *E. coli* ATCC#25922 agar plate culture was inoculated into 15-25 ml of Trypticase Soy Broth (TSB) in a sterile flask. The flask was incubated at 37° C. for at least 16 hours with shaking. The culture was then diluted into sterile pH 7.0 phosphate buffer to obtain approximately $10^5$ cfu/ml (colony forming units per milliliter). To obtain initial inoculum counts, final dilutions (prepared in phosphate buffer) of $10^{-4}$ and $10^{-3}$ onto Typticase Soy Agar (TSA) plates in duplicate were prepared, and the plates incubated at 37° C. overnight. The inoculated phosphate buffer (50 ml) was transferred into 3 sterile test flasks. Flask 1 contained no test film material. Flask 2 contained 0.5 g film of Example 1 treated with 1 w % chitosan. Flask 3 contained 0.5 g film of Example 1 with no treatment. A control buffer of 50 ml uninoculated phosphate buffer was also prepared in a separate sterile flask (Flask 4).

All flasks were placed in a wrist-action shaker and incubated with vigorous shaking at room temperature (about 25° C.). All flasks were sampled at 0, 1, 4 and 8 hours and plated into appropriated dilutions onto duplicate TSA plates. These plates were incubated at 37° C. for at least 16 hours, and the colonies counted in colony forming units per ml (cfu/ml) as reported in Table 5.

TABLE 5

*E. Coli* AT CC# 2592 (cfu/ml)

| Hours | Control Buffer | Inoculated Buffer | Control Film w/ Example 1 | Film of Example 1 w/1% chitosan soak |
| --- | --- | --- | --- | --- |
| 0 | 1.00E+00 | 1.11E+05 | 1.11E+05 | 1.11E+05 |
| 1 | 1.00E+00 | 1.33E+05 | 7.75E+04 | 1.36E+03 |
| 4 | 1.00E+00 | 1.24E+05 | 1.26E+05 | 2.50E+01 |
| 8 | 1.00E+00 | 1.56E+05 | 1.52E+05 | 1.00E+00 |

Films of Example 1 and Example 2 at 150μ in thickness were cut into 15 mm by 15 mm samples placed onto aluminum foil, and exposed to UV light in a laminar flow hood for 4 to 7 minutes. The samples were then transferred from foil to various solutions as described in Table 6 to soak for 12 to 24 hours at room temperature.

For each antimicrobial solution concentration, a spot on lawn assay procedure was first conducted on agar plates to assess the efficacy of the solution to colony control. In this procedure, the TSA agar plates were inoculated with *L. monocytogenes* 15313 at a level of 10E+08 cfu/ml through an Autoplate 4000 model from Spiral Biotech. A volumetric pipette pump was then used to place three 10-μl spots of an antimicrobial solution onto appropriate regions of the test plate. Separately, another volumetric pipette pump was used to place 10 μl of a control solution (i.e., the solution in which the antimicrobial agent is dissolved). Three such agar plates were prepared for each concentration of antimicrobial solution. After spot placement, the plates were allowed to stand undisturbed for 10 to 30 minutes in a laminar flow hood before incubation at 37° C. for at least 24 hours. The resultant zones of inhibition were measured using a dial caliper (Brown and Sharpe, accuracy to 0.02 mm) with each zone measured twice on a 90° axis. Three such spots (for the antimicrobial treated solution) were so measured per plate, with three plates per condition to provide 18 such measurements. The group averages of these measurements are shown in Table 6. No zone of inhibition was noted for any of the control spots. In the film on lawn procedure, 15 mm×15 mm films of example 1 and 2 were placed in freshly made up solutions for 12 to 24 hours at room temperature and then removed with a pair of flame-sterilized ocular forceps, allowed to drip dry, then placed for 60 seconds on a sterile Petri-dish before positioning on agar plates in a film on lawn assay procedure. The TSA agar plates had been prepared by inoculating with *L. monocytogenes* at a level of 10E+08 cfu/ml through an Autoplate 4000 model from Spiral Biotech. Two such films were so placed on the prepared TSA agar plates. A third 15 mm×15 mm film was soaked under the same conditions in a control solution (the solution without the antimicrobial agent) and placed in a third region of the plate. Three such plates were prepared in this manner for each concentration of antimicrobial agent. After film placement, the plates were allowed to stand undisturbed for 10 to 30 minutes in a laminar flow hood before incubation at 37° C. for at least 24 hours. The resultant zones of inhibition were measured using a dial caliper (Brown and Sharpe, accuracy to 0.02 mm) with each zone measured twice on a 90° axis. Two such films (for the antimicrobial treated film) were so measured per plate, with three plates per condition to provide 12 such measurements. The group averages of these measurements are reported in Table 6. No zones of inhibition were recorded for the control films.

In Table 6, nisin had an estimate of 455 IU/mg of Novaguard CB1, based on information provided by supplier (Rhodia). The antimicrobial components and the solution components totaled 100 wt %.

TABLE 6

| Antimicrobial Agent(s)[0] | | | Group averages of Inhibition Zones[1] (mm) | | |
|---|---|---|---|---|---|
| Component 1 | Component 2 | Solution[2] | Spot on Lawn Assay | Film on Lawn Assay Example 1 | Film on Lawn Assay Example 2 |
| Benzoic acid (0.75) | — | Ethanol/Water (36/63.25) | 7.31 ± 0.91 | 21.55 ± 0.77 | 23.49 ± 1.47 |
| Benzoic acid (1.5) | | Ethanol/Water (36/62.5) | 7.70 ± 0.61 | 25.92 ± 1.02 | 27.85 ± 0.96 |
| Benzoic acid (3.0) | | Ethanol/Water (36/61) | 8.64 ± 0.76 | 25.76 ± 0.41 | 27.6 ± 2.03 |
| Citric acid (5) | | Water (95) | — | Slight[3] | 0 |
| Citric acid (7.5) | | Water (92.5) | — | 19.21 ± 0.25 | 0 |
| Citric acid (10) | | Water (90) | — | 21.00 ± 0.63 | 0 |
| Benzoic Acid (2.9) | Nisin[4] (7500) | Ethanol/Water (60/35) | — | 30.26 ± 1.04 | 28.56 ± 1.22 |
| Benzoic acid (2.9) | Nisin[4] (10000) | Ethanol/Water (60/35) | — | 30.06 ± 0.49 | 28.33 ± 0.74 |

[0]The numbers in the parentheses are wt % (weight %).
[1]All control spots and control films showed no zones of inhibition.
[2]The solution was ethanol in water and the numbers in the parentheses are wt % of 95% ethanol/wt % of water.
[3]Inhibition zone was present, but not able to get quantitative measurement because entire zone did not encompass film.
[4]Nisin obtained from Rhodia Novaguard CB1, a lysozyme nisin grade with a reported level of 455 IU nisin/mg; the numbers in the parentheses are IU/ml; and IU/ml denotes International Units per milliliter of solution.

The invention claimed is:

1. A laminate film comprising (i) an inner layer; (ii) at least one antimicrobial agent; and (iii) an outer layer; wherein the film is biaxially oriented; the inner layer is a block copolyether ester polymer and has absorbed therein or therewith a solution of the antimicrobial agent; the outer layer is a single film layer, a laminate, or a multilayer film comprising or produced from at least one polymer layer and optionally at least one tie layer; and the polymer layer comprises or is produced from a polymer selected from the group consisting of polyamide, ethylene vinyl alcohol copolymer, polyvinylidene chloride, polyolefins, and combinations of two or more thereof.

2. The film of claim 1 wherein the inner layer consisting of the copolyether ester has a moisture vapor transmission rate (MVTR) of at least about 1200 g·25 µm²·24 hrs, or from about 1200 to about 20000 g·25 µm²·24 hrs.

3. The film of claim 2 wherein the inner layer is obtained from an ethylene oxide and propylene oxide copolyether glycol having a molecular weight of about 2150.

4. The film of claim 2 wherein the film is a blown film or a cast film.

5. The film of claim 1 wherein
the antimicrobial agent is (1) a combination of one or more bacterial polypeptides and one or more hop extracts, (2) a combination of a bactericidal compound and beta hops acid or beta hops acid derivative or both, (3) a combination comprising natamycin, dialkyl dicarbonate and a sorbate preservative, or (4) a combination comprising (a) calcium lactate and (b) a sequestering agent, a heat-treated lactic acid, a heat-treated glycolic acid, an antibiotic, lysozyme, pediocin, lacticin, immobilized lactoferrin, chitosan, benzoic acid, sorbic acid, or combinations of two or more thereof;
wherein the sequestering agent is citric acid, tartaric acid, maleic acid, oxalic acid, ascorbic acid, erythorbic acid, phosphoric acid, a salt thereof, or combinations of two or more thereof; and
the bactericidal compound is lantibiotic, pediocin, lacticin class bacteriocin, lytic enzyme, or combinations of two or more thereof.

6. The film of claim 2 wherein the antimicrobial agent is chitosan, benzoic acid, citric acid, nisin, or combinations of two or more thereof.

7. The film of claim 1 wherein the antimicrobial agent is chitosan, benzoic acid, citric acid, or combinations of two or more thereof.

8. An article comprising a laminate film comprising wherein the film is as recited in claim 1 and the article is a foodstuff, tubular casing, a thermoformed film, a vacuum skin film, box, blister, pouch, or bag.

9. The article of claim 8 wherein the inner layer of the film is obtained from an ethylene oxide and/or propylene oxide copolyether glycol having a moisture vapor transmission rate (MVTR) of at least about 1200 g·25µ/m²·24 hrs, or from about 1200 to about 20000 g·25µ/m²·24 hrs.

10. The article of claim 9 wherein the film is a blown film or a cast film.

11. The article of claim 8 wherein
the inner layer has absorbed therein or therewith a solution of the antimicrobial agent; and
the antimicrobial agent is nisin, chitosan, benzoic acid, citric acid, or combinations of two or more thereof.

12. A process comprising contacting a film with a solution comprising at least one antimicrobial agent to produce an antimicrobial film; optionally producing an article from the antimicrobial film; contacting the antimicrobial film or the article with foodstuff to produce a foodstuff containing antimicrobial agent; and optionally heating the foodstuff wherein the film is as recited in claim 1.

13. The process of claim 12 wherein
the article is tubular casing, a thermoformed film, a vacuum skin film, box, pouch, or bag;
the inner layer has absorbed therein or therewith a solution of the antimicrobial agent;

the antimicrobial agent is (1) nisin, (2) chitosan, (3) benzoic acid, (4) citric acid, (5) a combination of one or more bacterial polypeptide and one or more hop extracts, (6) a combination of a bactericidal compound and beta hops acid or beta hops acid derivative or both, (7) a combination comprising natamycin, dialkyl dicarbonate and a sorbate preservative, or (8) a combination comprising (a) calcium lactate and (b) a sequestering agent, a heat-treated lactic acid, a heat-treated glycolic acid, an antibiotic, lysozyme, pediocin, lacticin, immobilized lactoferrin, chitosan, benzoic acid, sorbic acid, or combinations of two or more thereof;

wherein the sequestering agent is citric acid, tartaric acid, maleic acid, oxalic acid, ascorbic acid, erythorbic acid, phosphoric acid, a salt thereof, or combinations of two or more thereof; and the bactericidal compound is lantibiotic, pediocin, lacticin class bacteriocin, lytic enzyme, or combinations of two or more thereof.

14. The process of claim 13 wherein the film is a blown film or a cast film.

15. The process of claim 12 wherein the antimicrobial agent is nisin, chitosan, benzoic acid, citric acid, or combinations of two or more thereof.

16. The process of claim 12 wherein the foodstuff is fresh meat, carcass meat, ready to eat meat, hot dog, or sausage.

17. The process of claim 15 wherein the foodstuff is fresh meat, carcass meat, ready to eat meat, hot dog, or sausage.

\* \* \* \* \*